United States Patent [19]

Sendor et al.

[11] 4,061,523

[45] Dec. 6, 1977

[54] PAPER WELDING APPARATUS FOR BOOKBINDING MACHINERY

[76] Inventors: Bernard T. Sendor, 608 Blair Drive, Westbury, Long Island, N.Y. 11429; Mortimer S. Sendor, 80-30, 221st St., Queens Village, Long Island, N.Y. 11590

[21] Appl. No.: 664,826

[22] Filed: Mar. 8, 1976

Related U.S. Application Data

[60] Division of Ser. No. 480,244, June 17, 1974, Pat. No. 3,943,024, which is a continuation of Ser. No. 220,761, Jan. 26, 1972, abandoned.

[51] Int. Cl.[2] ........................ B32B 19/02; H05B 5/00; B42D 1/00

[52] U.S. Cl. ................................ 156/380; 219/10.75; 219/10.81; 281/21 R

[58] Field of Search ............... 219/10.75, 10.81, 10.77, 219/10.57, 10.53; 156/273, 380; 281/21; 11/1 R, 1 AD

[56] References Cited

U.S. PATENT DOCUMENTS

| | | | |
|---|---|---|---|
| 2,968,336 | 1/1961 | Martin et al. | 281/21 R |
| 3,093,396 | 6/1963 | Segreto | 281/21 R |

*Primary Examiner*—Douglas J. Drummond
*Attorney, Agent, or Firm*—Roy C. Hopgood; John M. Calimafde; Charles W. Neill

[57] ABSTRACT

This invention bonds the paper pages of books without applying adhesive to the paper. Clamping jaws press the paper sheets of a book together along the edges that are to be bound. The paper is a weldable paper and the sheets bond to one another where they are clamped in contact and raised to a welding temperature by heat of one or both of the clamping jaws, radio frequency energy or otherwise. The temperature must be at least as high as the welding temperature of the paper and not so high that it will scorch or otherwise damage the paper. The clamping and welding apparatus are combined with other book-making machinery and located along the course followed by the unfinished book at a station where the welding step can be done automatically and with substantial saving in the usual labor required.

13 Claims, 9 Drawing Figures

PAPER WELDING APPARATUS FOR BOOKBINDING MACHINERY

RELATED APPLICATION

This is a division of application Ser. No. 480,244, filed June 17, 1974, now U.S. Pat. No. 3,943,024, which is a continuation of patent application Ser. No. 220,761, filed Jan. 26, 1972, now abandoned.

BACKGROUND AND SUMMARY OF THE INVENTION

The binding of books by welding the edges of the pages of special paper is disclosed in our U.S. Pat. No. 3,560,290, issued Feb. 2, 1971. A number of different kinds of apparatus for welding the paper together are disclosed in that patent.

One of the advantages of welding is that since it is a clean process and requires no application of adhesive, no control of the quantity of adhesive applied and no protection of other parts of the pages and apparatus from accumulations of adhesive. The welding step is well suited to performance on machines that perform other operations on the book such as folding or collating. This invention includes welding apparatus embodied in a folding machine and also includes welding apparatus embodied in a gathering machine. Such machines will be referred to generically herein as "apparatus for assembling sheets" in a desired order.

The invention will be described in a folding machine between the last and next to last folding stations. Signatures on their way to the last folding station are welded along the line on which the last fold will be made so that when the sheets of the signature are folded at the last station, they are already bound together along the fold line and it is unnecessary to use adhesive or to sew or staple the sheets of the signature, or to trim off the folds so that adhesive can be applied to individual pages. The welded signature is bound together as strongly as any system and more strongly than most. The pages must be split to separate them; and this connection is made automatically and without slowing down the output of the folding machine.

The invention will also be described in a gathering machine in which individual pages or signatures are brought together in the sequence in which they are to be bound, and instead of transferring them to another machine for securing the sheets or signatures together, they are welded together at the delivery station, where successive assembled sheets or signatures are removed from the gathering machine. Again the operation can be automatic and performed on the gathering machine without decreasing the output of the machine. The start-up and clean-up labor of adhesive applicators is eliminated.

Other objects, features and advantages of the invention will appear or be pointed out as the description proceeds.

BRIEF DESCRIPTION OF DRAWING

In the drawing, forming a part hereof, in which like reference characters indicate corresponding parts in all the views.

DESCRIPTION OF PREFERRED EMBODIMENT

Figure 1:
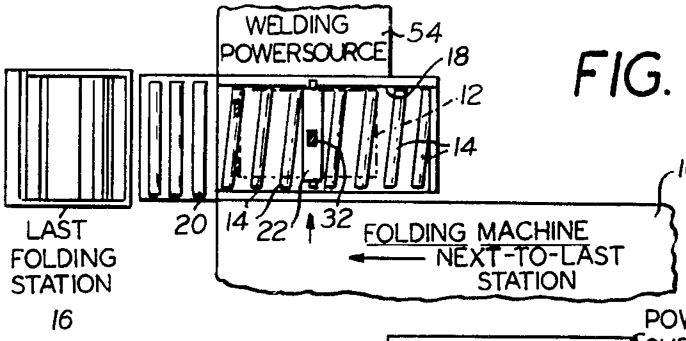
FIG. 1 is a diagrammatic view showing signature welding apparatus located between the last and next to last fold station of a folding machine.

In FIG. 1, a conventional folding machine 10 delivers a signature 12 to a roller conveyor 14 by which the signature is delivered to a last folding station 16 of the folding machine.

The rollers of the conveyor 14 have their axes slightly canted so that as the rollers are rotated by conventional power means (not shown), the signature 12 is shifted up against a side plate 18 of the conveyor 14. There are stop fingers 20 extending downwardly close to the rollers of conveyor 14 and serving as abutments to stop the signature 12 when it is advanced toward the left in FIG. 1 until the leading edge of the signature comes in contact with the fingers 20. With the signature 12 stopped in this position, the center line along which the signature is to be folded in the last folding station 16 is located under a welding bar holder 22.

Figure 2:
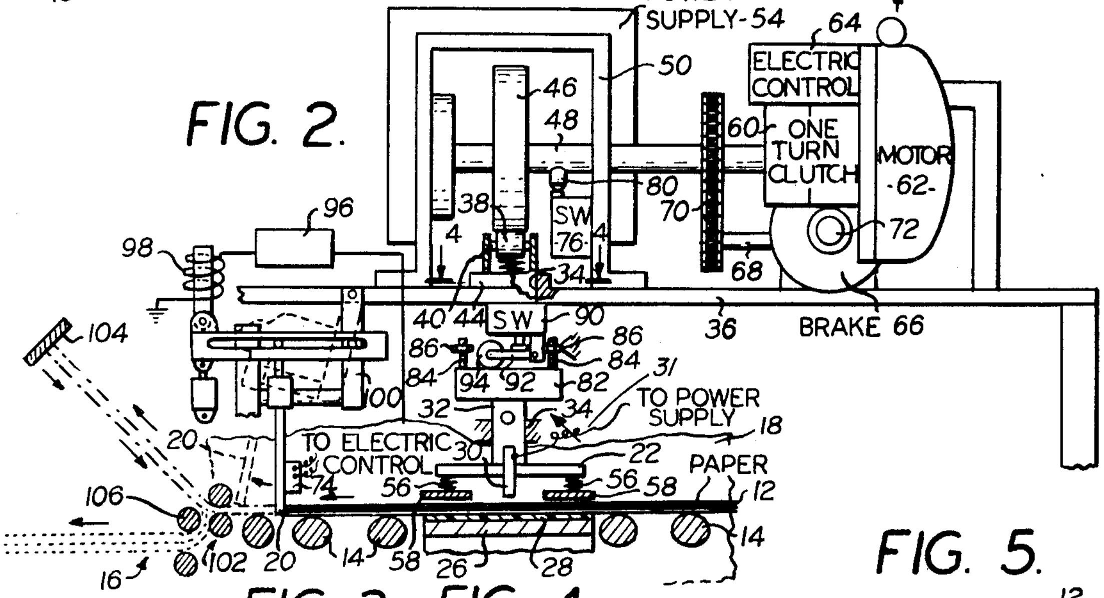
FIG. 2 is a diagrammatic view showing the apparatus for welding the signature at the welding station of FIG. 1 and showing the apparatus for effecting the welding operation.

FIG. 2 shows the signature 12 resting on the conveyor rollers 14 and with a back-up support 26 located under the signature between successive conveyor rollers 14 and with a plastic buffer coating 28 covering the top of the back-up support, the plane of the top surface of the buffer coating 28 being coincident with a plane tangent to the rollers 14 of the conveyor. Thus the paper of the signature 12 lies perfectly flat as it rests on the conveyor rollers 14 and the buffer coating 23 of the back-up support 26.

FIG. 2 shows the welding bar holder 22 located above the signature 12 and with a welding bar 30 supported by the holder 22. It is the welder bar 30 which is located directly over the center line of the signature 12 which will be folded in the last folding station and along which the sheets of the signature are to welded together in accordance with this invention. The welding bar can be of several configurations or thicknesses as the design and subsequent needs of the book require. For example, it can have a discontinuous clamping face if spot welds are to be used.

Figure 3:
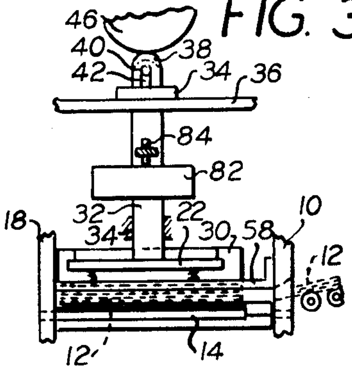
FIG. 3 is a diagrammatic end view of the apparatus of FIG. 2 that makes the weld.

The welding bar holder 22 is attached to the lower end of a ram 32 which is movable up and down in a bearing 34 which is a rigid part of a frame 36 of the conveyor 14. At the upper end of the ram 32 there is a cam follower 38 which rotates with respect to the ram 32 and this cam follower 38 has axles 40 at either end which can move up and down in slots 42 in the side walls of the ram 32 as shown best in FIG. 3. The cam follower 32 is urged upward toward the upper ends of the slots 42 by a spring 44 (FIG. 2); and the purpose of the spring 44 and the slots in which the axles 40 move is to provide some resilience for taking up shock when the ram 32 is thrust downward by rapid rotation of a cam 46 secured to a cam shaft 48 which rotates in bearings in opposite sides of a fixed frame 50.

When the cam 46 rotates, it pushes the ram 32 downward and brings the welder bar 30 into contact with the paper of the signature 12. The welder bar 30 clamps the sheets of paper into firm contact with one another and clamps them against the plastic buffer coating on the top surface of the back-up support 26; and at the same time the paper is heated along the line of clamping, to a welding temperature.

Heat is applied by contact of the welder bar 30 with the paper of the signature and one purpose of the plastic buffer coating 28 is to retain heat so that it will supply some of the heating of the paper to the next signature to be operated upon by the apparatus. In the illustrated apparatus, the principal heat is applied by radio frequency energy supplied to the welder bar 30 from a power supply 54 located behind the frame 50 and preferably supported by the frame 50. Other ways of applying heat to the paper are disclosed in our U.S. Pat. No. 3,560,290, previously referred to.

Figure 9:
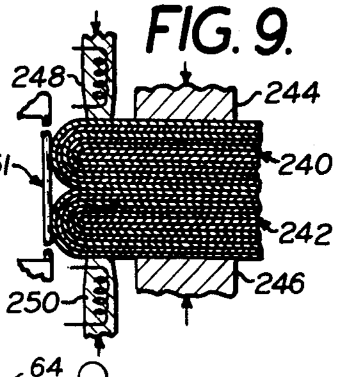
FIG. 9 shows a modified apparatus for heating the leaves.
Figure 7:
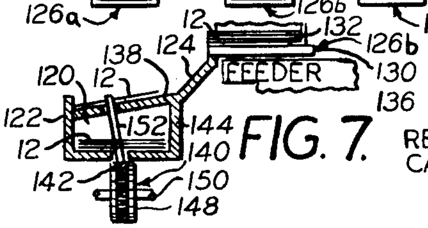
FIGS. 7 and 8 are diagrammatic sectional views taken on the lines 7—7 and 8—8, respectively of FIG. 6.

FIG. 9 is FIG. 7 of our U.S. Pat. No. 3,560,290, and it shows two signatures 240 and 242. If these signatures are thin, they can be previously welded along their folds. This can be done to hold the individual signatures in assembled relation, but it is not necessry when a signature is to be welded to another signature because the same welding which joins signatures together also joins the leaves of the individual signatures to one another.

FIG. 9 has clamping jaws 244 and 246 which hold the signatures in assembled relation with one another. These clamped jaws 244 and 246 may cover the entire areas of the signatures 240 and 242 except for the edge portions which are to be welded. Other clamping jaws 248 and 250 contact with the edge regions of the signatures 240 and 242 and press these edge regions together with substantial pressure at the rearward edges of the leaves where they are joined together at a fold.

The clamping jaws 248 and 250 may be heated to supply the necessary welding heat in FIG. 9. Because of the low heat conductivity of most kinds of paper, it is more advantageous to heat paper by using a high frequency electromagnetic field from a stray field electrode assembly 251. The high frequency dielectric field heats the paper between the jaws 248 and 250 and the heat is generated in the paper itself so that it is not necessary to rely on temperature gradients or conduction to reach the inner leaves. The intensity of the field and its duration are sufficient to bring the paper to a welding temperature between the clamping jaws 248 and 250.

The width of the weld is controlled by having the clamping faces of the jaws 248 and 250 relatively narrow. Because of this narrow width of the jaws 248 and 250, and the fact that they are close to one edge of the stack of leaves, it is advisable not to rely upon these jaws as the only means for holding the signatures in the desired assembled relation. The clamping jaws 244 and 246 are representative of other means for holding the signatures in the desired assembled relation during the welding operation.

The radio frequency energy is used to heat the paper where there are a substantial number of sheets in the signature 12 and reliance on conduction heating would be slow. Conduction heating cannot be applied quickly where there are a substantial number of sheets to penetrate with the heat because the only way to obtain fast penetration with paper sheets which are not good conductors of heat is by means of steep temperature gradients. Such gradients cannot be used where there are many sheets because the temperature applied to the outer sheets becomes so high as to scorch the outer sheets. Conduction heat is suitable where the thickness to be penetrated is limited as with a few sheets heated from the sides or a thick book is heated at the backbone.

With radio frequency heating, however, heat is generated in the paper itself and the temperature of the inner sheets of the signature can be raised to a welding temperature quickly. In fact, inner sheets may be heated more quickly than the outer sheets with radio frequency heating because the outer sheets are in position to give up some of their heat to the contact elements by which the sheets are clamped for welding. It is advantageous, therefore, to have the clamping surfaces sufficiently heated so that there is no substantial loss of the heat generated in the paper to the clamping elements. For this reason, the welder bar 30 and the plastic buffer coating 28 are preferably maintained at a temperature of between about 100°–102° F when the apparatus is in operation. Such temperatures can be maintained by waste heat from the welding operation provided that the welding bar holder and the back-up support do not connect with large masses of cool metal which would act as heat sinks.

When the region of maximum radius of the cam 46 has rotated beyond the cam follower 44, the ram 32 is pushed back to its raised position by springs 56 located between the welder bar holder 22 and transverse frame elements 58 on which the springs 56 rest. These transverse frame elements 58 extend across the top of the conveyor 14 and are preferably connected at opposite ends to the side plate 18 (FIG. 3) and the frame of the folding machine 10.

The welder bar 30 is preferably made of steel and the welder bar holder can be made of the same material. Polytetrofluoroethylene (Teflon) is the preferred material for the plastic buffer coating 28 and can conveniently be applied to the back-up support 26 in the form of tape. The back-up support 26 is preferably made of brass but other material can be used. One advantage of the coating 28 is that it prevents possible sticking of the paper of the signature 12 to the back-up support.

The cam shaft 48 extends into a housing 60 of a one turn clutch which is driven by a motor 62. When the folding machine is in operation, the motor 62 runs continuously and when the clutch in the housing 60 is actuated by an electric control 64, the clutch engages, and then disengages automatically. Such one way clutches are well known mechanical expedients and no further description of the clutch is necessary for a complete understanding of this invention.

In order to stop the cam 46, cam shaft 48, and the driven side of the one-way clutch quickly, the apparatus is equipped with a brake 66. This brake 66 is applied to a brake shaft 68 driven from the cam shaft 48 through a chain and sprocket connection 70. The electric control 64 causes the brake 66 to be released at the same time that the electric control 64 causes the clutch in the housing to be engaged. Conversely, the electric control 64 applies the brake 66 when the clutch in the housing 60 is disengaged. A manual adjustment 72 controls the force of the brake when applied to the brake shaft 68.

Initiation of the operation of the electric control 64 is brought about by a photocell 74 located just above the conveyor 14 at the stop fingers 20. A microswitch or any other sensing device that can detect without disturbing the movement of the paper can be used in place of the photocell. Whenever the leading edge of a signature 12 comes under the photocell 74, a signal from the photocell to the electric control 64 causes the one-turn clutch to engage and the brake 66 to release so that the cam 46 makes a revolution and operates the welder bar 30 into contact with the paper on the back-up support 26. The operation of the power supply 54 to supply the heating energy for welding the paper can be controlled from the electric control 64 or from a switch 76 attached to the frame 50 in position to contact an actuator 80 carried by the cam shaft 48 in position to depress a button at the top of the switch 74 in the path of the actuator 80.

There is a collar 82 on the ram 32 in position to contact abutment screws 84 which act as limit stops for determining how high the ram 32 rises under influence of the springs 56 after the region of maximum radius of the cam follower 38. These abutment screws 84 thread through fixed lugs 86 that are part of the fixed frame of the machine. There is a micro switch 90 secured to the frame 36, and this micro switch has an operating arm 92 with a wheel 94 at the free end of the arm 92. The wheel 94 is in the path of the collar 82 and upward movement of the collar 82 causes momentary closing of the switch 90 to supply power to a relay 96 which closes to energize the solenoid 98 which operates support structure 100 that carries the stop fingers 20.

The solenoid 98 swings the fingers 20 upward out of the path of the signature 12. The conveyor rollers 14 are operated continuously and slip on the bottom of the signature 12 while the signature is held against movement by the stop fingers 20. When the stop fingers 20 move into the dotted line position shown in FIG. 2, in response to the energizing of the solenoid 98, the rollers 14 advance the signature 12 into the last folding station 16. The folding station 16 is of conventional construction and is illustrated diagrammatically. The forward end of the signature is advanced by the conveyor into a roll pass 102 of the folder, and guide roll 106 deflects the signature upward as the signature is advanced by the feed roll pass 102 into contact with an abutment 104. This stops further movement of the leading edge of the signature 12 and since the signature is still being pushed forward by the feed roll pass 102, the paper bends just beyond the feed roll pass 102 and is deflected into the pass between the roll 106 and the lower roll of the feed roll pass 102. These rolls fold the signature and as the signature continues to advance, with the fold as the leading edge, the portion that was pushed up against the abutment 104 is drawn down through the pass between roll 106 and the lower roll of the feed roll pass 106.

The abutment 104 is located in a position which stops the advance of the unfolded signature 12 when the center line of the signature is in position to fold in between the rollers 102 and 106 as the result of the further feeding movement of the conveyor rollers 14. The folder 16 being of conventional construction need not be described in detail for a complete understanding of this invention. The significance of the folding station 16, insofar as this invention is concerned, is merely that the welding station which secures the pages of a signature together operates automatically to then advance the signature into a folding station where the signature will be folded along the line where the weld has been made. Any other folding station that will accomplish this purpose can be used in place of the folding station 16. The diagrammatic illustration of FIG. 2 shows an attachment of a KS folder manufactured by the Dexter Folder Company.

Figure 4:
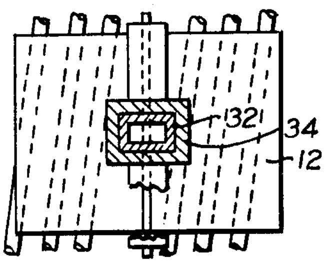
FIG. 4 is a sectional view taken on the line 5—5 of FIG. 2.
Figure 5:
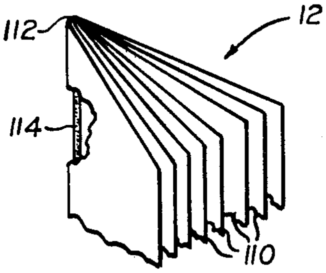
FIG. 5 is a fragmentary view, partly broken away, showing the sheets of a signature as welded together by the apparatus of FIGS. 2–5.

FIG. 5 shows the signature 12 after folding and with the pages somewhat separated at their free edges for better illustration. There are eight sheets shown in FIG. 4 and designated by the reference character 110. The fold is indicated by the reference character 112 and some of the sheets are broken away to show the weld line which is indicated by the reference character 114.

Figure 6:
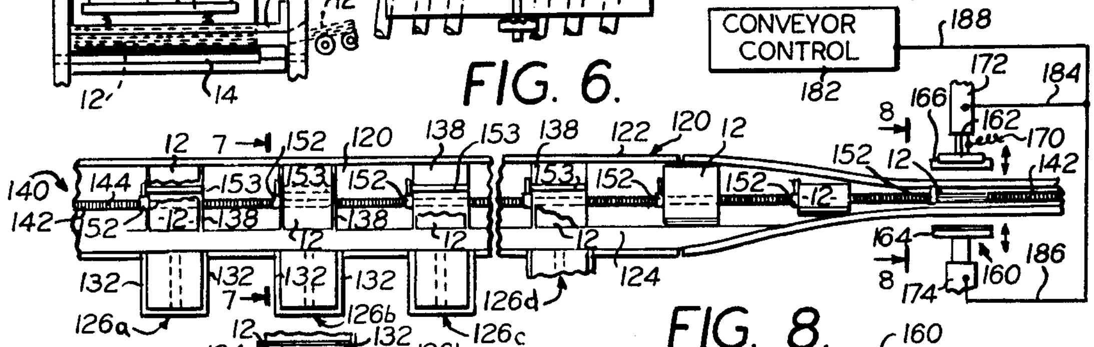
FIG. 6 is a top plan view showing diagrammatically as gathering or collating machine with apparatus for welding the pages together at the delivery end of the machine.

FIG. 6 shows a gathering or collating machine which comprises a trough 120 comprising a frame section 122 and a side wall section 124. There are stations **126*a*, 126*b*, 126*c* and 126*d* at which pages or signatures 12, which are to be collated, are located. For a gathering machine capable of gathering fifteen signatures there must be fifteen stations similar to the stations 126*a–d***. If individual sheets are collated, instead of signatures, then there must be as many stations as there are sheets for the book. If more sheets or signatures are required, than there are stations on the gathering machine, then the work is run through the the gathering machine as many times as necessary.

The operation will be described with signatures 12 at the different stations and a stack of signatures 12 is shown in FIG. 7 on a support 130 at the station **126*b*. All of the signatures 12 at the station 126*b* are the same and each one constitutes the signature which is to follow one taken from a corresponding stack at the station 126*a*, and which is to precede a signature taken from the stack at the station 126*c***.

The signatures 12 in FIG. 7 are held in stacked relation on the support 130 by guides between which they are placed when the gathering machine is being set up for operation. The guides shown in FIGS. 6 and 7 are side walls 132 extending upward from the supports on which the signatures rest. Automatic feed means 136 remove signatures one at a time from the bottom of the stack at each of the stations **126*a–d*. These automatic feed means 136 are illustrated diagrammatically in FIG. 7. They are of conventional construction and include suction cups that contact with the bottom of the stacks of signatures through slots in the supports 130 on which the stacks rest. For purposes of this invention it is sufficient to understand that each of the feed means 136 operates to displace the bottom signature from the stack onto a shelf 138 that extends across the trough 120**.

A conveyor 140 comprising an endless chain 142 is located under a slot 144 located between the lower end of the side wall section 124 and a horizontal portion of the frame section 122. This endless chain 142 runs on sprockets 148 supported by axles 150 at spaced locations along the length of the gathering machine.

Projections 152 are attached at their lower ends to the conveyor chain and these projections 152 extend upward through the slot 144 to a height somewhat above the shelf 138. There is a slot 153 through each shelf and the upper end of each projection 152 projects through the slot 153 of each shelf 138 to push a signature 12 off the shelf so that the signatures at successive stations drop on top of those which the projection 152 is pushing along the trough 120. As the conveyor 140 operates with continuous motion, the projections 152 propel groups of signatures along the trough from left to right as viewed in FIG. 6.

The spacing of the projections 152 along the conveyor is equal to the spacing of the stations 126*a–d* from one another so that the projections from the conveyor chain displaces signatures from the shelves 138 onto the other signatures at the same time. Then another signature is fed to each of the shelves 138 before the next projection 152 reaches the shelves.

By the time the conveyor 140 has moved a signature from the first station to the end of the trough 120, other signatures have been piled on top of the first signature to complete the assembly of the pages of the book in the desired sequence. This is a well-known operation in bookbinding and can be performed on different kinds of machines from that illustrated diagrammatically in FIGS. 6 and 7.

Figure 8:
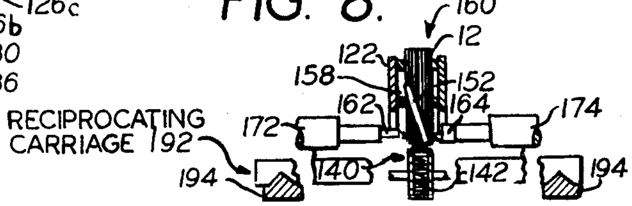

As the trough 120 extends toward the discharge end of the gathering machine, the trough becomes narrower. In the construction illustrated, the vertical wall of the frame section 122 moves progressively closer to the slot 144; and the bottom of the trough on the other side of the slot 144 slopes upward and eventually becomes vertical as shown in FIG. 8 so as to turn the group of signatures 12 upright with the folded ends or backs of the signatures at the bottom. Guide elements 158 are preferably attached to the confronting surfaces of the vertical faces of the trough in FIG. 8 to reduce friction against the assembled signatures 12 as they advance toward the discharge end of the gathering machine.

Near the discharge end of the gathering machine, this invention provides means which make this part of the gathering machine a welding station 160. At the welding station 160 there are clamping jaws 162 and 164 which move horizontally into contact with the lower edge portion of the assembled signatures 12. In FIG. 8 the clamping jaw 162 is shown with a bar 166 which is heated and which applies both heat and pressure to the assembled signatures 12 to weld the pages of the signatures together. For thick books, both of the jaws 162 and 164 can be heated; and where the thickness of the book makes it difficult to have the heat penetrate to the inner pages by conduction, radio frequency heating is used as disclosed in our U.S. Pat. No. 3,560,290. Electric power for heating the jaw 162 is supplied through a conductor 170.

Actuators 172 and 174 move the jaws 162 and 164 into contact with the assembled signatures 12 and out of contact when the pages have been welded. The particular mechanism of the actuators 172 and 174 forms no part of the present invention.

The conveyor control for the gathering machine is indicated by the reference character 182 and it is of conventional construction as part of the gathering machine which is also conventional. Control circuits indicated by reference characters 184, 186 and 188 connect the actuators 172 and 174 with the conveyor control 182 with relays that cause the actuators 172 and 174 to bring the clamping jaws 162 and 164 into contact with the assembled signatures 12 at the welding station 160 each time a new group of signatures reaches the welding station, and the control causes the clamping jaws 162 and 164 to move away from the assembled signatures 12 when the sheets are welded. The pressure and heat of the jaws 162 and 164 is coordinated with the clamping period so as to effect the weld without overheating the paper.

Since the conveyor chain of the gathering machine moves continuously, it is necessary that the clamping jaws 164 and 166 also move at the speed of the conveyor chain while they are in contact with the group of signatures 12 to weld the signatures together.

To obtain such motion, the actuators 172 and 174 are mounted on a carriage 192 which slides on fixed guide rails 194 extending parallel to the direction of movement of the group of signatures 12 through the gathering machine. The carriage 192 is reciprocated back and forth along the rails 194, moving in the direction of the group of signatures 12 during the welding period, and moving back in the opposite direction after welding and before the next group of signatures 12 reaches the welding station.

It is conventional to have such reciprocating carriages on measuring machines for supporting stitching mechanism which is used to stitch signatures together while they are in motion. The present invention substitutes the welding apparatus for the stitching apparatus, and the reciprocating carriage can be of conventional construction.

After the group of signatures 12 has been welded at the welding station, it can be advanced to a cover station where a cover is applied to the bottom of the group of signatures and the signatures with the cover passed through a cover breaker along a straight line in line with the conveyor chain or by passing the welded signatures into a rotary covering apparatus of conventional construction.

Preferred embodiments of the invention have been illustrated and described, but changes and modifications can be made and some features can be used in different combinations without departing from the invention as defined in the claims.

What is claimed is:

1. Apparatus for binding books by welding paper sheets together including in combination clamping jaws for applying a stationary pressure to a group of paper sheets in contact with each other along regions that constitute edges of pages printed on said sheets, means for heating the paper along said regions including a radio-frequency generator, connections through which radio-frequency power from the generator can generate paper-welding heat in the clamped edges of the sheets, means for changing the heat for welding in accordance with the thickness of the group of sheets, with which the apparatus is used, to raise the clamped edges to a welding temperature of the paper and a limited temperature that avoids overheating and scorching of the paper sheets, and means for urging the clamped jaws together, the means urging the clamping jaws together having their force coordinated with the power supply from the radio-frequency generator to the paper so that the pressure between adjacent sheets of paper is high enough to prevent flashover of the radio-frequency power between adjacent sheets.

2. The apparatus described in claim 1 characterized by the different jaws being connected with conductors from opposite sides of the circuit of the radio-frequency generator and constituting part of said connections through which power is supplied to the clamped edge portions of the sheets of paper.

3. The apparatus described in claim 2 characterized by the paper to be welded being clamped between the jaws and the paper and the jaws constituting part of the tuned circuit of the radio-frequency generator, means for varying the tuning of the generator for obtaining a desired oscillation when the jaws and paper portions of the circuit are at a clamping pressure high enough to avoid flashover, the means for urging the jaws together being adjustable to vary the clamping force.

4. The apparatus described in claim 1 characterized by the jaws that clamp the edge portions of the paper having clamping faces made of electrical insulating material, and the connections through which the radio-frequency power is applied to the clamping jaws being stray field electrodes.

5. The apparatus described in claim 4 characterized by the stray field electrodes being located close to the back edge of the group of paper sheets for obtaining maximum flux at the back edges of the sheets.

6. The apparatus described in claim 4 characterized by the stray field electrodes extending substantially normal to the planes of the sheets of paper.

7. The apparatus described in claim 1 characterized by the connections through which the radio-frequency is supplied to the paper being stray field electrodes.

8. The apparatus described in claim 7 characterized by means for supplying heat to the clamping jaws to prevent heat sink cooling, by said jaws, of the outside of the sheets of the group of paper sheets below the welding temperature of the paper during welding of the inner sheets.

9. The apparatus described in claim 1 characterized by means for maintaining heat in the clamping jaws adjacent to the edges of the top and bottom sheets of the group of sheets to be welded for compensating for heat losses from these exposed sheets when heat is generated in the sheets of the group by dielectric heat from the radio-frequency power.

10. The apparatus described in claim 1 characterized by means for imparting a surge of the radio-frequency power to the paper, and pressure transmitting means for increasing the clamping pressure on the paper just prior to the operation of said means for imparting the surge on radio-frequency power.

11. The apparatus described in claim 10 characterized by the means for imparting the surge of high frequency power being operated from the pressure transmitting means.

12. The apparatus described in claim 11 characterized by the means for imparting the surge of power being an electric switch in a trigger circuit of the radio-frequency generator, said switch being in a path of a part of the apparatus connected to and movable with the pressure transmitting means.

13. The apparatus described in claim 1 characterized by a hydraulic motor actuator for operating one of the clamping jaws to supply pressure to the paper, a source of high pressure working fluid, a passage through which the working fluid is supplied from said source to the actuator, and control means for supplying the working fluid at predetermined pressure, said control means including apparatus for adjusting the downstream or delivery pressure of the working fluid to change the magnitude of said working fluid pressure.

* * * * *